US012270470B2

(12) United States Patent
Pennazza et al.

(10) Patent No.: US 12,270,470 B2
(45) Date of Patent: Apr. 8, 2025

(54) TENSIONER FOR AN ACCESSORY DRIVE OF A MOTOR VEHICLE AND ACCESSORY DRIVE INCLUDING SUCH A TENSIONER

(71) Applicant: DAYCO EUROPE S.R.L., Chieti (IT)

(72) Inventors: Mario Pennazza, Pescara (IT); Ettore Ramin, Chieti (IT)

(73) Assignee: MUVIQ S.R.L., Ivera (IT)

( * ) Notice: Subject to any disclaimer, the term of this patent is extended or adjusted under 35 U.S.C. 154(b) by 0 days.

(21) Appl. No.: 18/003,937

(22) PCT Filed: Jul. 1, 2021

(86) PCT No.: PCT/IB2021/055921
§ 371 (c)(1),
(2) Date: Dec. 30, 2022

(87) PCT Pub. No.: WO2022/003624
PCT Pub. Date: Jan. 6, 2022

(65) Prior Publication Data
US 2023/0258247 A1    Aug. 17, 2023

(30) Foreign Application Priority Data

Jul. 1, 2020   (IT) .................. 102020000015877

(51) Int. Cl.
*F16H 7/12*    (2006.01)
*F16H 7/08*    (2006.01)

(52) U.S. Cl.
CPC ... *F16H 7/1245* (2013.01); *F16H 2007/0865* (2013.01); *F16H 2007/0874* (2013.01);
(Continued)

(58) Field of Classification Search
CPC ........... F16H 2007/0874; F16H 7/1245; F16H 2007/0865; F16H 2007/0893;
(Continued)

(56) References Cited

U.S. PATENT DOCUMENTS 4,270,906 A * 6/1981 Kraft .................... F16H 7/1281
74/567
6,648,783 B1 * 11/2003 Bogner ................ F16H 7/1281
474/134
(Continued)

FOREIGN PATENT DOCUMENTS

DE    102017118233 A1 *  2/2019

OTHER PUBLICATIONS

PCT/IB2021/055921, International Search Report and Written Opinion, Aug. 27, 2021 (12 pages).

*Primary Examiner* — Michael R Mansen
*Assistant Examiner* — Katelynne R Burrell
(74) *Attorney, Agent, or Firm* — FisherBroyles, LLP; Susan M. Oiler (57) ABSTRACT

A tensioner for an accessory drive of an internal combustion engine has a belt on a first pulley connected to a drive shaft of the engine and a second pulley connected to an electric machine. The tensioner has a base configured to be fixed to a casing of the electric machine, a first ring rotating with respect to the base about a first axis, a second ring rotating with respect to the first ring about a second axis distinct from the first axis, a first tensioning pulley carried by the first ring and rotating with respect to it about its own axis, a second tensioning pulley carried by the second ring and rotating with respect to it about its own axis and elastic means acting on the first and on the second ring to push the first and the second pulleys into contact with respective spans of the belt.

16 Claims, 12 Drawing Sheets

(52) U.S. Cl.
CPC ............... *F16H 2007/0893* (2013.01); *F16H 2007/0897* (2013.01)

(58) Field of Classification Search
CPC ....... F16H 2007/0897; F16H 2007/806; F16H 2007/0878; F16H 7/1281
USPC ................................. 474/134, 133; 267/136
See application file for complete search history.

(56) References Cited

U.S. PATENT DOCUMENTS

| | | | | |
|---|---|---|---|---|
| 9,810,296 | B2* | 11/2017 | Pfeifer | F16H 7/1281 |
| 10,962,092 | B2* | 3/2021 | Liu | F16H 7/1281 |
| 11,629,778 | B2* | 4/2023 | Stadermann | F16H 7/1209 |
| | | | | 474/133 |
| 2003/0220164 | A1* | 11/2003 | Tamai | F16H 7/1281 |
| | | | | 474/134 |
| 2006/0089223 | A1* | 4/2006 | Van Vooren | A01D 43/086 |
| | | | | 474/133 |
| 2013/0040770 | A1* | 2/2013 | Wolf | F16H 7/1281 |
| | | | | 474/134 |
| 2015/0345597 | A1* | 12/2015 | Walter | F16H 7/1218 |
| | | | | 474/134 |
| 2018/0010670 | A1* | 1/2018 | Leucht | F16H 7/1245 |
| 2018/0363742 | A1* | 12/2018 | Dec | F16H 7/0831 |
| 2019/0017579 | A1* | 1/2019 | Stadermann | F16H 7/12 |
| 2019/0063564 | A1* | 2/2019 | Artz | F16H 7/1281 |
| 2019/0203811 | A1* | 7/2019 | Maricic | F16H 7/08 |
| 2019/0285147 | A1* | 9/2019 | Singh | F16H 7/1218 |
| 2022/0268342 | A1* | 8/2022 | Ronchetto | F16H 7/08 |

\* cited by examiner

TENSIONER FOR AN ACCESSORY DRIVE OF A MOTOR VEHICLE AND ACCESSORY DRIVE INCLUDING SUCH A TENSIONER

CROSS-REFERENCE TO RELATED APPLICATIONS

The present invention is filed under 35 U.S.C. § 371 as the U.S. National Phase of International Patent Application No. PCT/IB2021/055921, filed Jul. 1, 2021, which designated the United States and which claims the benefit of Italian patent application no. 102020000015877, filed on Jul. 1, 2020, the entire disclosure of which is incorporated herein by reference.

TECHNICAL FIELD

The present invention concerns a tensioner for an accessory drive of a motor vehicle and accessory drive including such a tensioner.

STATE OF THE ART

The accessory drive of an internal combustion engine generally comprises a pulley connected to the drive shaft, a pulley connected to the shaft of the electric machine and can comprise one or more pulleys for driving other accessories such as, for example, the conditioning system compressor. The accessory drive further comprises a belt for transmission of the movement between the above-mentioned pulleys and a tensioner configured to ensure a correct minimum tension level of the belt and prevent slipping between the belt and the pulleys.

In conventional accessory drives, in which the electric machine is an alternator driven by the engine, the tensioner acts on the slack span of the belt, namely the span located downstream of the engine and upstream of the alternator with reference to the belt movement direction.

In motor vehicles, a reversible electric machine is increasingly frequently used in place of the conventional alternator; said reversible electric machine can operate not only in the conventional generator mode, but also according to further modes, for example as a regenerative brake (recuperation condition), or as an additional motor operating in combination with the internal combustion engine (boost condition).

With the use of a reversible electric machine, the span of the belt which is taut in the operating conditions in which the electric machine is driven by the engine becomes the slack span when the torque is delivered by the electric machine.

Various solutions have therefore been devised which ensure correct tensioning of both spans of the belt.

One solution consists, for example, in using a tensioner with two arms hinged on a common pin and bearing respective pulleys. The arms are subject to the elastic force of a spring which tends to move them close to each other so as to maintain the pulleys in contact with respective spans of the belt. An example of this solution is described in EP 1581753-A. The common axis of the two arms is arranged within the path of the belt.

The overall dimensions of the base on which the arms pivot and of the spring arranged around the common articulation axis of the arms are such as to make this solution unsuitable for applications in which space constraints exist within the path of the belt such as, for example, in the case of the drive having only two pulleys. Furthermore, the arrangement of the arms with respect to the resultant forces acting on the pulleys is not optimal.

Another solution consists in mounting the tensioner on the electric machine.

According to a known solution, the tensioner comprises a base configured to be fixed to the electric machine, a first annular element rotating with respect to the base around the axis of the electric machine and bearing a first pulley, and a second annular element rotating with respect to the base around the axis of the electric machine and bearing a second pulley.

A spring acts between the two annular elements configured to exert an elastic force between said elements in order to maintain the first and the second pulleys in contact with respective spans of the belt.

A drawback connected with the above-mentioned solution is the need to operate at a relatively high belt tension to allow optimal functioning in the recuperation and boost conditions.

According to another known solution, the tensioner comprises a base configured to be fixed to the electric machine, an annular element with respect to the base around the axis of the electric machine and bearing a first pulley, and arm hinged to the annular element and bearing a second pulley.

A problem connected with this solution is the difficulty of obtaining symmetrical characteristics in the positive and negative torque conditions of the electric machine.

DISCLOSURE OF INVENTION

The object of the present invention is to produce a tensioner for an accessory drive which is without the drawbacks connected with the known tensioners specified above.

The above-mentioned object is achieved by a tensioner for an accessory drive that has a first pulley connected to a drive shaft of an engine, a second pulley connected to an electric machine, and a belt wound at least on the first and second pulleys. The tensioner has a base configured to be fixed to a casing of the electric machine, a first ring rotating with respect to the base about a first axis (A1), a second ring rotating with respect to the first ring about a second axis (A2) distinct from the first axis (A1), a first tensioning pulley carried by the first ring and rotating with respect to the first ring about its own axis (PA1), a second tensioning pulley carried by the second ring and rotating with respect to the second ring about its own axis (PA2), and elastic means acting on the first and second rings to push the first and second tensioning pulleys into contact with respective spans of the belt. The second axis (A2) is located inside the first ring and orbits around the first axis (A1) when the first ring rotates about the first axis (A1).

BRIEF DESCRIPTION OF THE DRAWINGS

For a better understanding of the present invention a preferred embodiment is described, by way of non-limiting example and with reference to the attached drawings, in which.

BEST MODE FOR CARRYING OUT THE INVENTION

Figure 1:
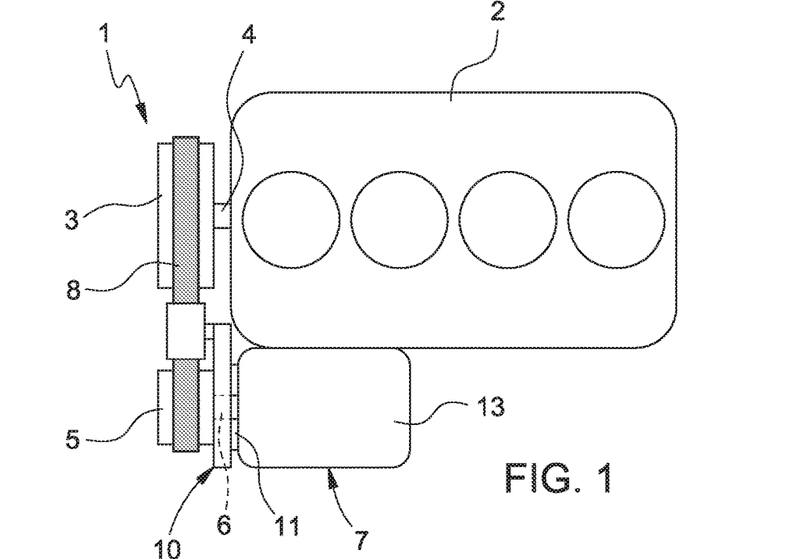
FIG. 1 is a schematic top view of an engine provided with an accessory drive with a tensioner according to the invention.
Figure 2:
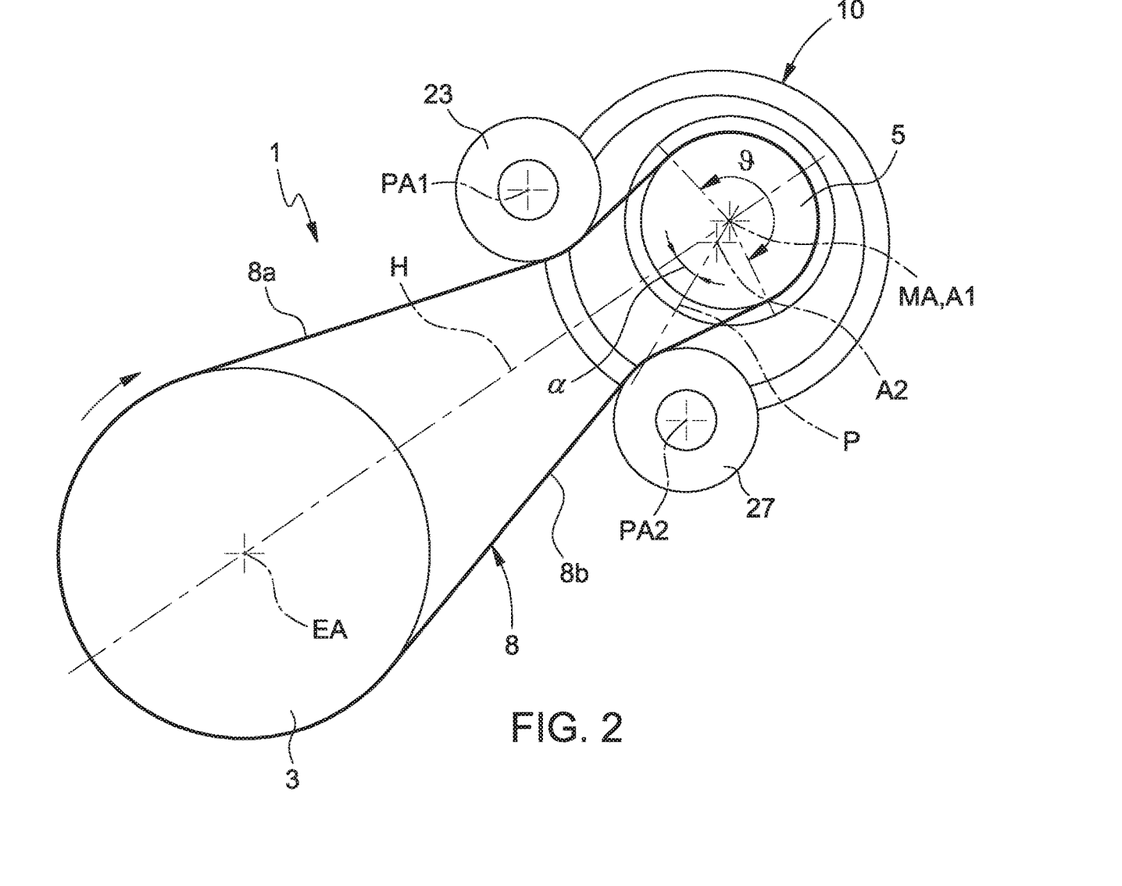
FIG. 2 is a schematic front view of the accessory drive of FIG. 1.
Figure 3:
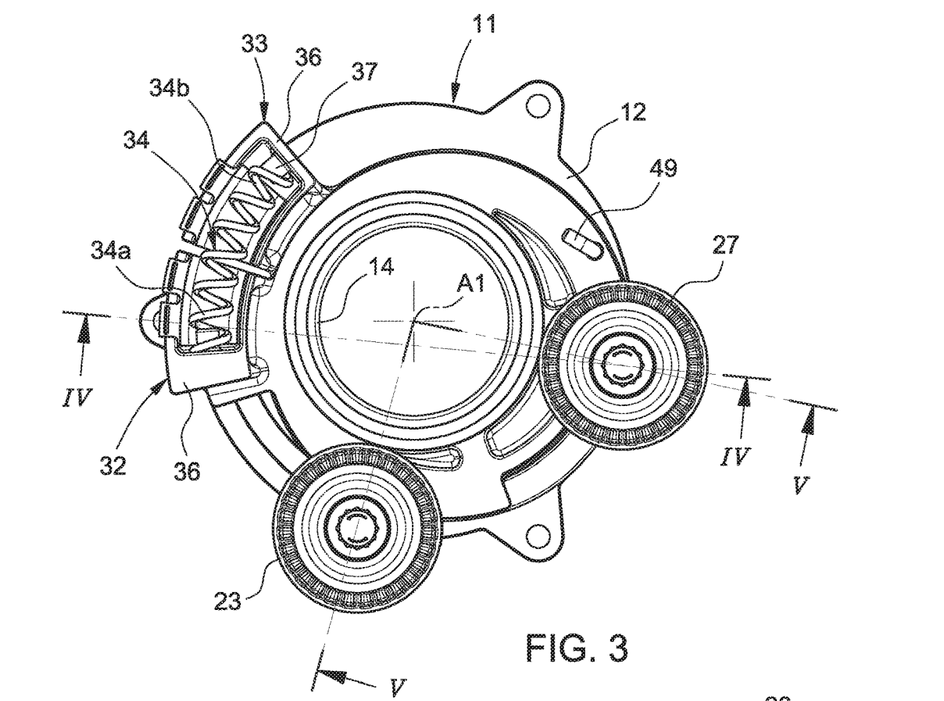
FIG. 3 is a front view of a first embodiment of the tensioner of FIG. 1.
Figure 4:
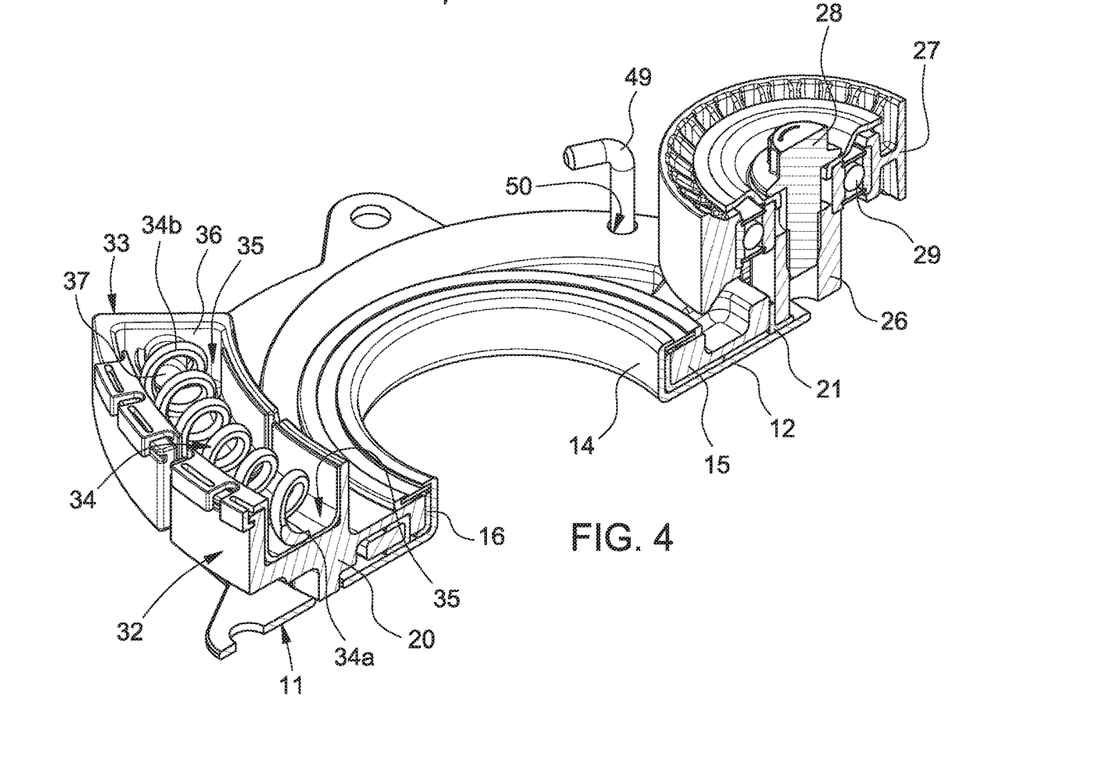
FIG. 4 is a partial perspective view sectioned along the line IV-IV of FIG. 3.

With reference to FIGS. 1 and 2, the number 1 indicates an accessory drive of an internal combustion engine 2.

The accessory drive 1 comprises a first pulley 3 connected to a drive shaft 4 of the engine E, with axis EA, a second pulley 5 connected to a shaft 6 of an electric machine 7, with axis MA, and a belt 8 that connects the first pulley 3 and the second pulley 5 to each other. The accessory drive can comprise other pulleys, not illustrated, for driving other accessories of the engine 1 such as, for example, a conditioning system compressor.

The accessory drive 1 further comprises a tensioner 10 mounted on the electric machine 7 and comprising (FIGS. 3-7):
- a base 11 integrally comprising a flat flange 12 configured to be fixed to a casing 13 of the electric machine 7 (FIGS. 1 and 5) and an annular collar 14, with axis A1 coinciding in use with the axis MA, extending axially in a cantilever fashion from the flange 12;
- a first ring 15 rotatably supported on the base 11 around the collar 14 by means of a first bushing 16 having a flat annular portion 17 axially interposed between the first ring 15 and the flange 12 and a cylindrical portion 18, with axis A1, radially interposed between the first ring 15 and the collar 14 (FIG. 5); and
- a second ring 20 rotatably supported on the base 11 around the first ring 15 by means of a bushing 21 which encloses an inner edge thereof and has, for the purpose, a C-shaped section for at least a dominant portion of its circumference; the bushing 21 is expediently pressed onto the inner edge of the second ring 20.

Figure 5:
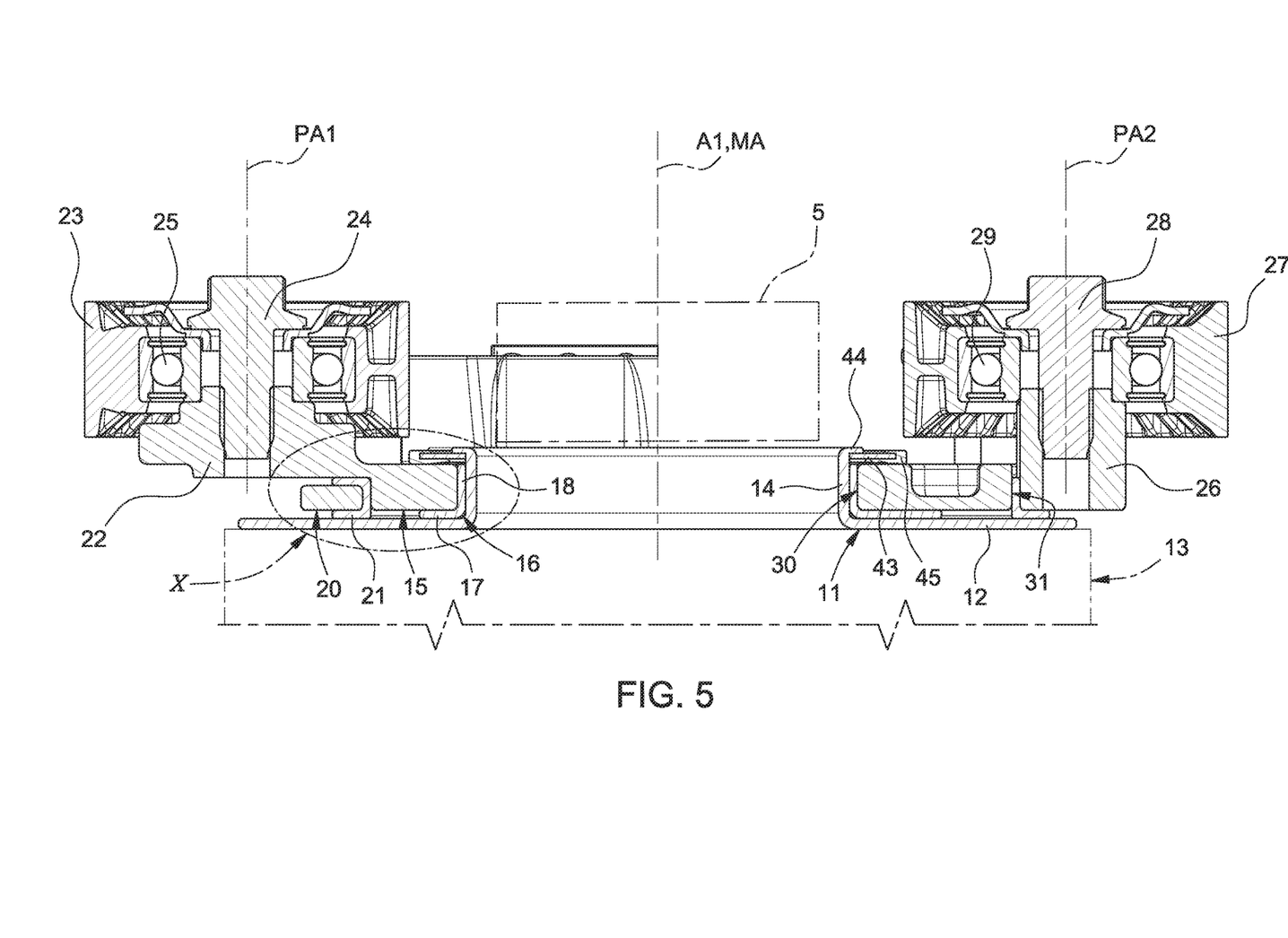
FIG. 5 is a section according to the line V-V of FIG. 3.
Figure 6:
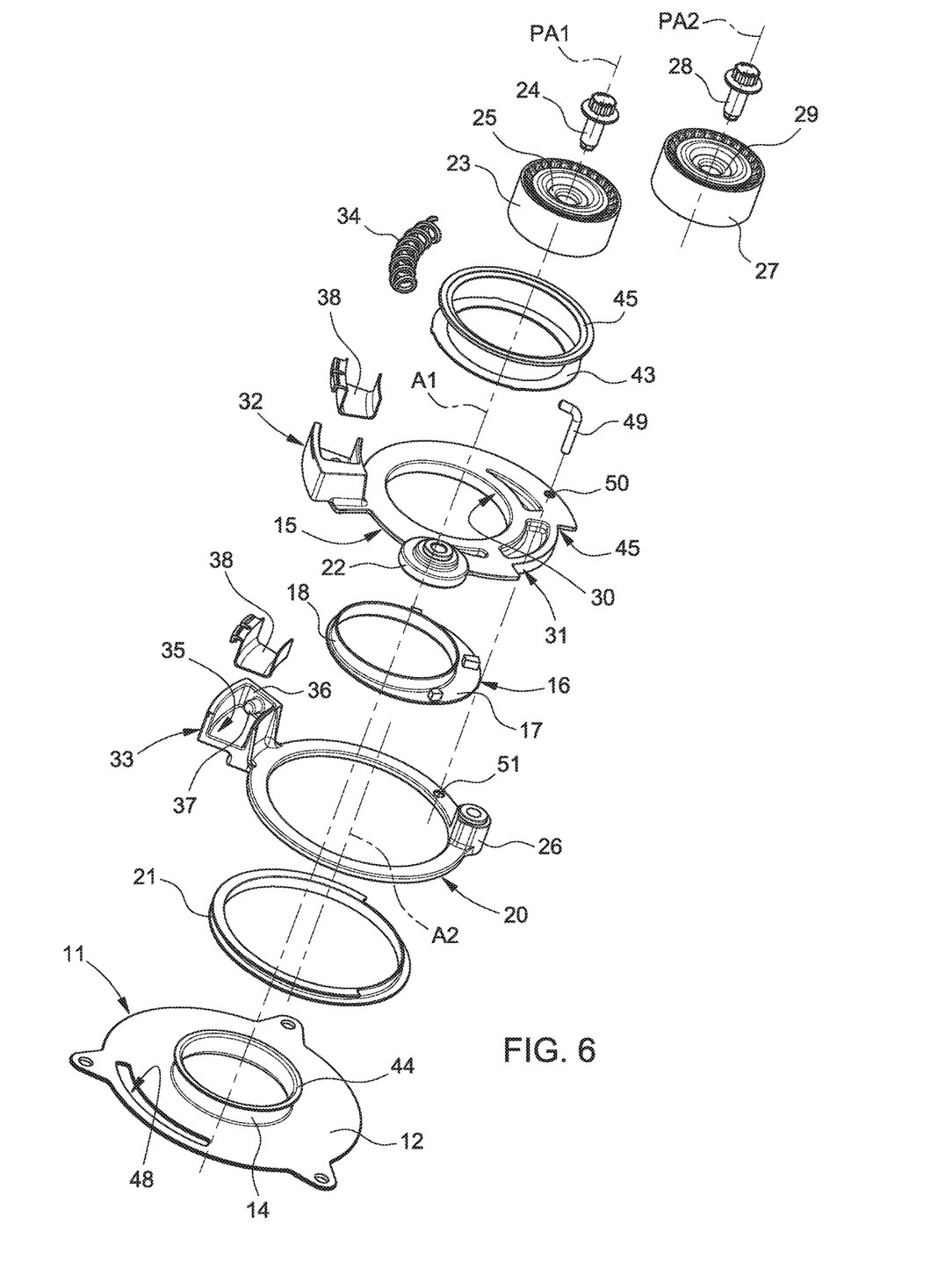
FIG. 6 and FIG. 7 are exploded perspective views of the tensioner of FIG. 3, in axially opposite directions.
Figure 7:
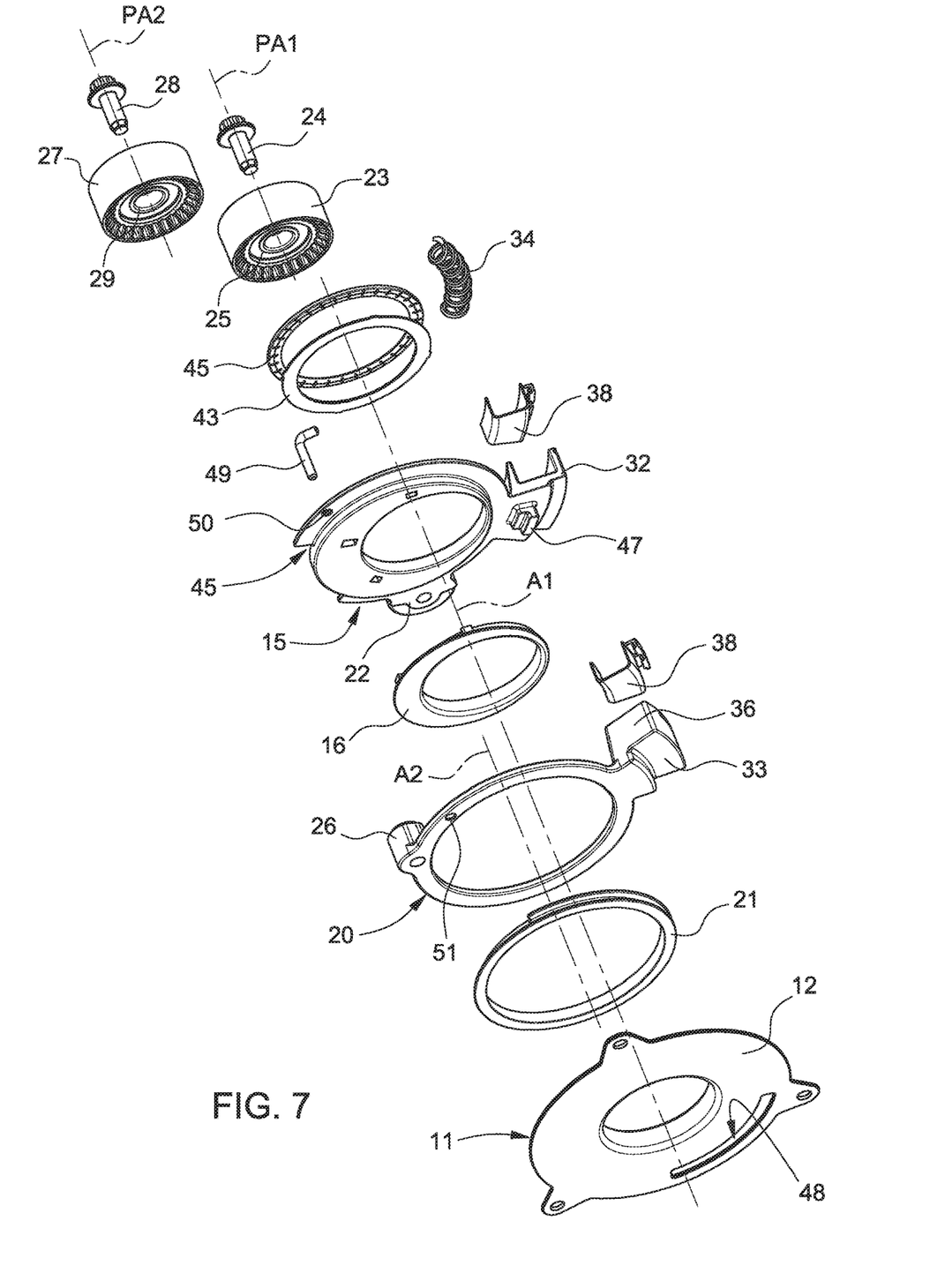

The base 11 and the rings 15, 20 have an inner diameter greater than the diameter of the second pulley 5 so as to allow assembly of the tensioner 10 on the electric machine 7 in the presence of the second pulley 5 (see FIG. 5, in which the overall dimension of the pulley 5 is illustrated schematically by a dot-dash line).

The first ring 15 comprises a radial outer appendage 22 supporting in a rotating manner a first pulley 23 of the tensioner 10, with axis PA1, by means of a pin 24 and a bearing 25. The second ring 20 comprises a tubular axial appendage 26, extending in a cantilever fashion from the opposite side of the flange 12 of the base 11, on which a second pulley 27 of the tensioner 12, with axis PA2, is rotatably mounted by means of a pin 28 and a bearing 29.

The first and the second pulleys 23, 27 are configured to cooperate with respective sections 8a, 8b of the belt arranged upstream and downstream respectively of the second pulley 5 according to the feed direction of the belt (clockwise, with reference to FIG. 2).

According to the present invention, the second ring 20 rotates with respect to the first ring 15 around an axis A2 parallel to the axis A1 and distinct from it. The axis A2 is arranged inside the first ring 15 and orbits around the axis A1 when the first ring 15 rotates. For this purpose, the first ring 15 has a cylindrical inner surface 30 with axis A1, which rotates around the cylindrical portion 18 of the bushing 16, and an eccentric cylindrical outer surface 31 with axis A2, which radially supports the bushing 21.

The first ring 15 and the second ring 20 define respective housings 32, 33 for a spring 34 having the purpose of generating an elastic force tending to maintain the pulleys 23, 27 in contact with the belt 8 and therefore maintain, in use, a predefined tension level in said belt 8.

The spring 34 (FIGS. 3-5) is an arc-shaped helical compression spring arranged circumferentially with respect to the rings 15, 20. The housings 32, 33 consist of radial appendages of the respective rings 15, 20 and house respective end portions 34a, 34b of the spring 34. The housings 32, 33 define respective circumferential channels 35 having U-shaped section and closed, on circumferentially opposite sides from each other, by respective radial walls 36 defining respective shoulders for the opposite ends of the spring 34. Respective projections 37 for centring the spring 34 extend from the walls 36. Inside the channels 34, half-shells 38 made of plastic are housed; said half-shells house the spring 34, so as to prevent direct contact between the spring and the housings 32, 33.

The first ring 15 is axially locked on the flange 12 of the base 11 by a disc spring 43 (FIGS. 5-7) axially compressed between an annular end edge 44 of the collar 14 of the base 11 and the first ring 15. To avoid direct contact between the disc spring 43 and the first ring 15, the spring 43 is provided with a coating made of plastic material 45 which covers the outer edge thereof.

The tubular appendage 26 of the second ring 20 is arranged inside a recess 45 (FIG. 6) obtained on a periphery of the first ring 15 in order to limit the relative rotation between the rings 15, 20 between a free arm position corresponding to the maximum longitudinal expansion of the spring 34 and a load stop position corresponding to a position of maximum compression of the spring 34.

The first ring 15 has at the bottom a protrusion 47 (FIG. 7) configured to slidingly engage an arched groove 48 of the flange 12 of the base 11, so as to limit the angle of rotation of the first ring 15 with respect to the base 11.

In the absence of reaction forces from the belt 8, the spring 34 tends to maintain the rings 15, 20 in the free arm position. In order to allow easy assembly of the belt 8, prior to installation the rings 15, 20 are locked to each other in a relative angular installation position by a locking pin 49 (FIGS. 3-5) which engages respective holes 50, 51 thereof. The installation position is expediently near to the load stop position.

Once the belt has been installed, the pin 49 is removed and, under the action of the spring 34, the tensioner goes to the nominal position illustrated schematically in FIG. 2, in which the two pulleys 23, 27 are in a symmetrical position with respect to the bisector line H of the winding angle θ of the belt 8 on the pulley 5, coinciding with the direction of the resultant of the pull of the belt 8 on the pulley 5 in nominal conditions.

Operation of the tensioner 10 is as follows.

In normal operating conditions, the engine 2 delivers torque and the electric machine 7 is driven and operates as an alternator. In this condition, the span 8b of the belt is the taut span and the span 8a is the slack span.

With respect to the nominal position illustrated in FIG. 2, the tensioner 10 rotates clockwise around the axis A1 as a result of the hubload transmitted by the taut span 8b to the pulley 27. Under the thrust of the spring 34, which tends to move the pulleys 23 and 24 close to each other, the pulley 23 acts on the slack span 8*a* maintaining in the same a pre-set minimum tension value as the torque varies.

In boost mode, the electric machine 7 delivers motive power (positive torque) which is added to that of the engine 2. This tends to reduce the tension in the span 8*b* and to increase the tension in the span 8*a* of the belt. In the recuperation mode, on the other hand, the electric machine 7 absorbs mechanical power (negative torque), and therefore the tension in the span 8*a* of the belt 8 tends to decrease.

The use of a rotation axis A2 of the second ring 20 distinct from the axis A1 of the first ring (coincident in use, as said, with the axis MA of the electric machine 7) allows for reduction of the installation tension of the belt 8, with the torque transmission capacity in the slack span (understood as the span which is slack each time according to the operating conditions).

Figure 8:
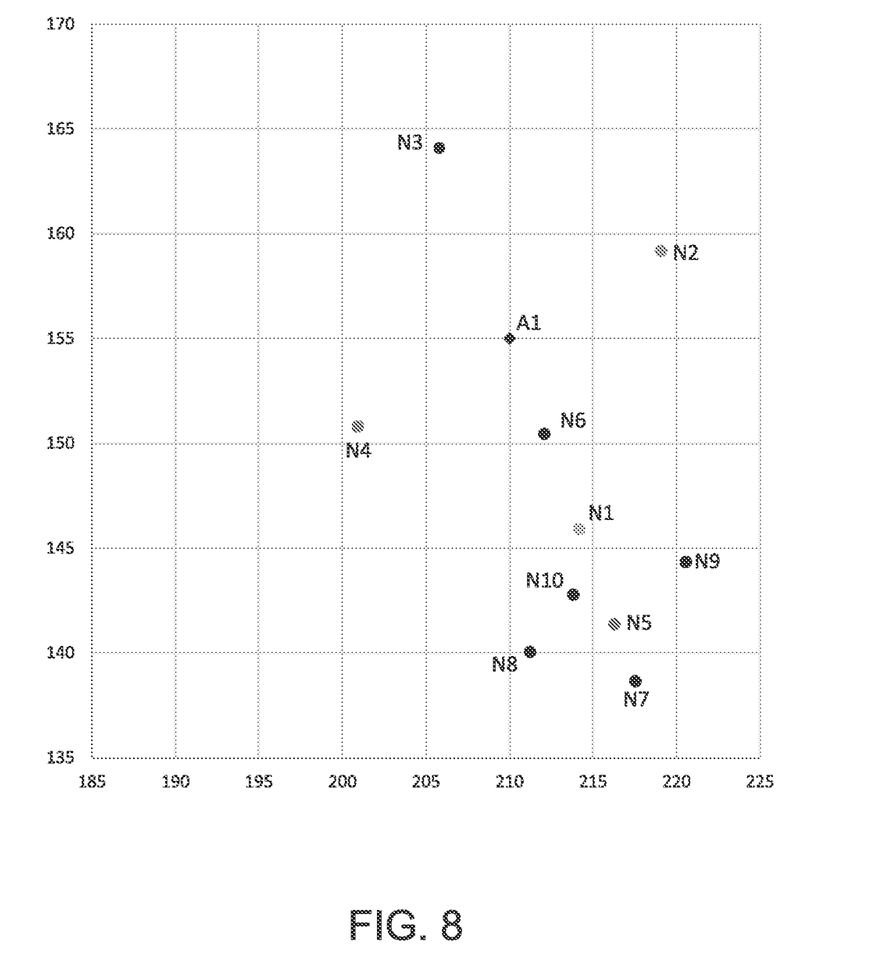
FIGS. 8 to 13 are graphs that comparatively illustrate quantities relative to various embodiments of the present invention.

FIG. 8 is a graph that illustrates different positions of the axis A2 with respect to the axis A1 (where the X and Y axes represent the coordinates in mm measured from the axis of the drive shaft), indicated as N1-N10. A1 indicates a comparative example in which the axis A2 coincides with the axis A1 of the electric machine 7 (coordinates 210; 155 with respect to the axis of the drive shaft).

Figure 9:
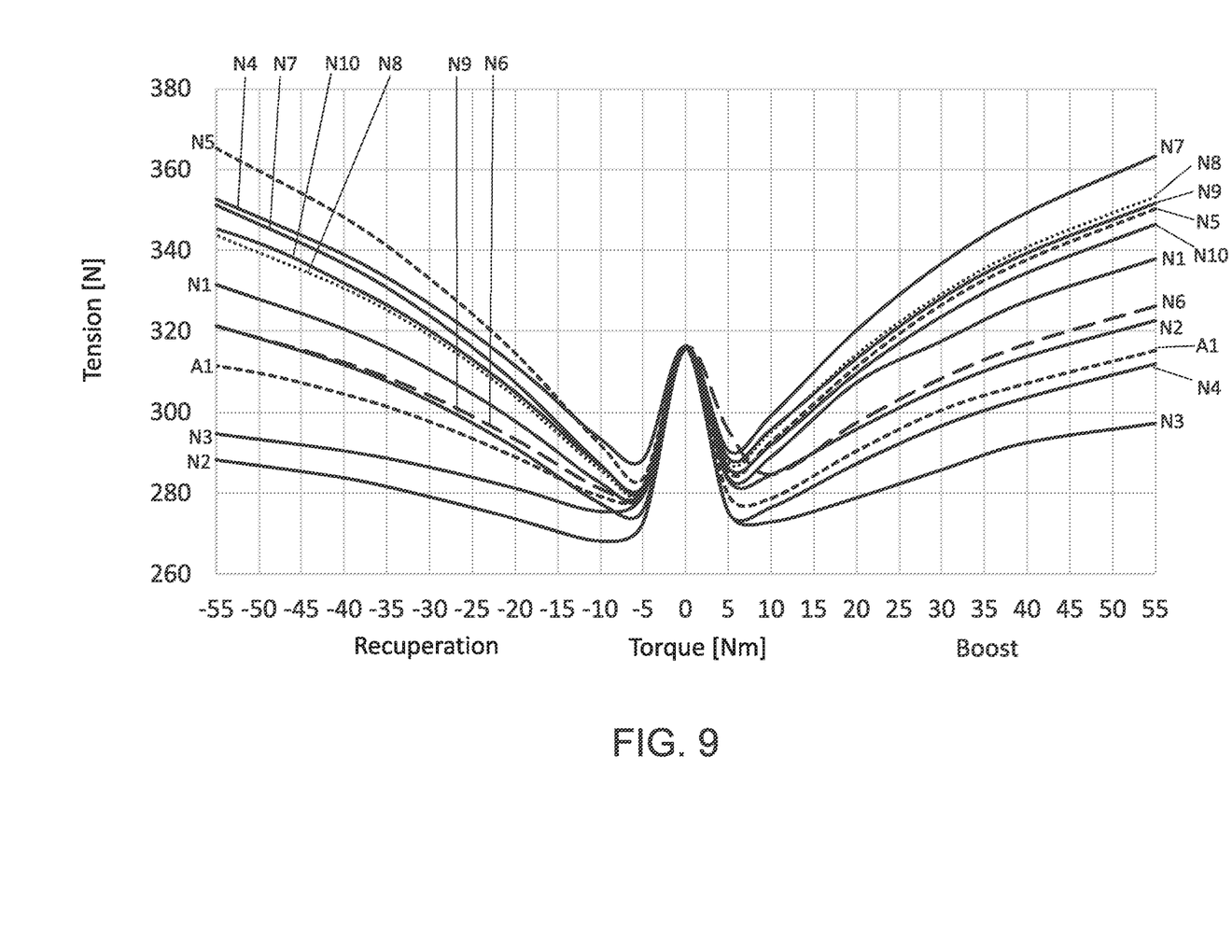

FIG. 9 is a graph that represents, for the points of the graph of FIG. 8, the trend of the tension in the slack span of the belt 8 when the torque of the electric machine 7 varies (negative torque values identify the recuperation mode, and positive values identify the boost mode).

The torque value of 0 corresponds to the belt installation tension, the same for all the examples (315 N). The line A1 represents also in this case the comparative example in which the axes A1 and A2 coincide.

Given the same installation tension, the examples N1 and N5-N10 determine an increasingly higher tension of the slack span with respect to the comparative example A1, while in examples N2, N3 and N4 the tension of the slack span is lower than the comparative example at least in one of the recuperation and boost conditions. Of the positive examples, N10 is the best as it presents a symmetry of the tension curves in recuperation and boost conditions (as can be seen from the graph of FIG. 9, the tension values at the extremes of the curve torque values, equal to +/−55 Nm, are substantially the same).

The increase in tension in the slack span can be exploited to lower the installation tension of the belt.

Figure 10:
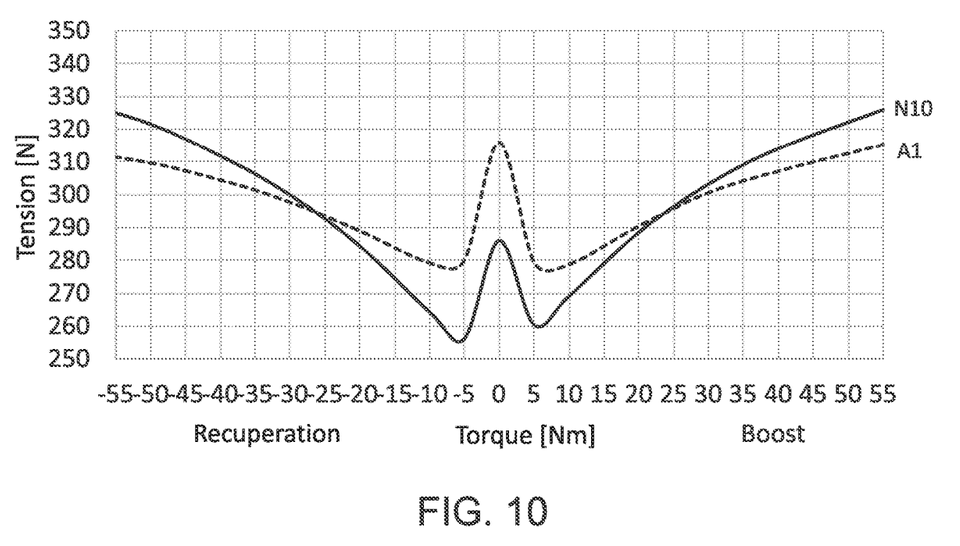

FIG. 10 illustrates, for the example N10 of FIG. 9, a condition in which the installation tension has been lowered by 50N with respect to the comparative example (265 N instead of 315 N). From an examination of the figure, it is easy to see that in a normal operating range, from approximately −25 to +25 Nm, in which there are no risks of slipping, the tension remains lower than the reference example; this entails a reduction in losses due to friction and therefore a reduction in consumption.

In the regions with high torque (>25 Nm in module), on the other hand, where problems of slipping can occur, the drive becomes more rigid than when axes A1, A2 coincide, and the torque transmission capacity is improved.

Figure 11:
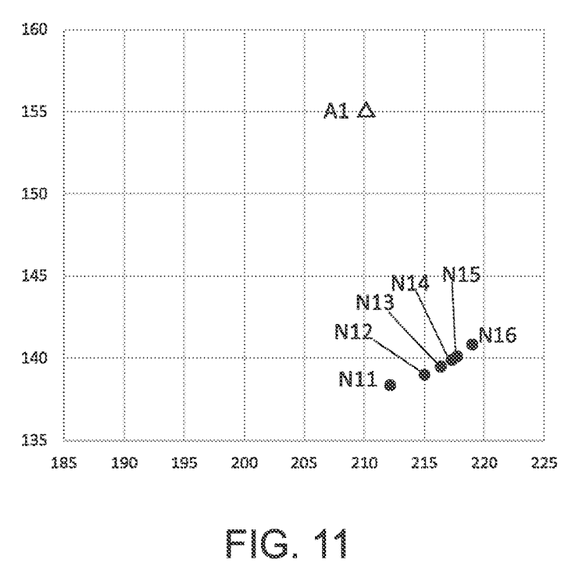
Figure 12:
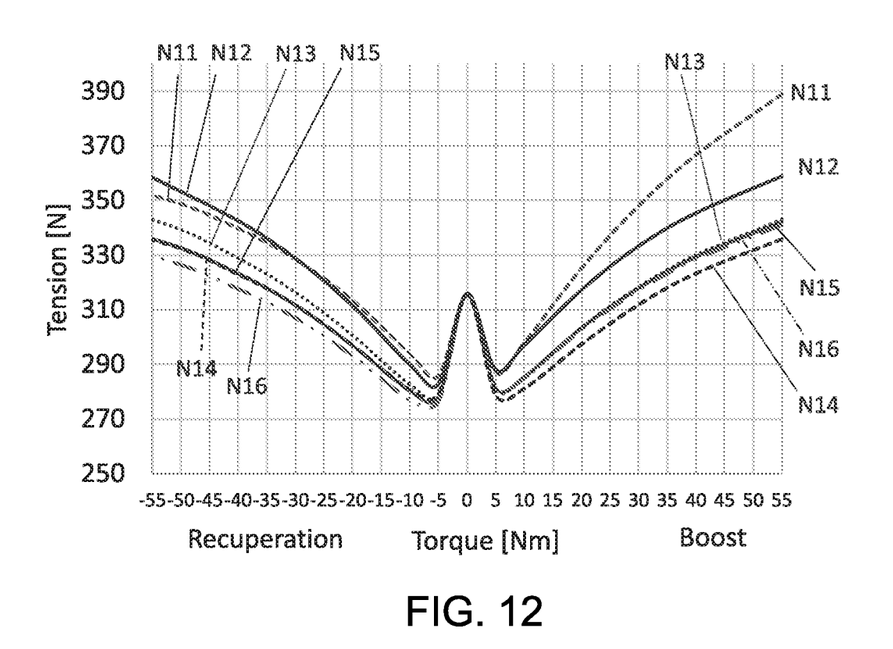

In order to clarify the incidence factors of the position of A2 compared to A1 on the balance of the tension of the slack span in the recuperation and boost conditions, FIG. 11 shows various further examples N11-N16 corresponding to positions of the axis A2 situated at equal distance from the axis A1. Namely, the points N11-N16 are on a circumference with centre A1 (axis A2 coincident with A1). Different behaviours correspond to these points, given the same distance A1-A2 (FIG. 12), from which it is deduced that the key factor is not the distance between A1 and A2.

It has been experimentally verified that the determining factor to obtain symmetric behaviour of the tensioner 10 in the positive and negative torque conditions is the angle formed between the plane identified by the axes A1-A2 and the plane containing the axis A1 and the bisector H of the winding angle θ of the belt 8 on the pulley 5 of the electric machine 7 (FIG. 2) in nominal conditions. It should be noted that in the symmetric layout of the drive 1 with only two pulleys illustrated in FIG. 2, the bisector H intersects the axis of the drive shaft EA, but this condition does not generally occur.

The optimal angle α varies as the winding angle θ varies and is expressed by the relation determined experimentally:

$$\alpha = -0.2166\theta + 97.267 + c,$$

where α and θ are expressed in degrees (°) and c is a variable ranging from +10° to −10°.

Figure 13:
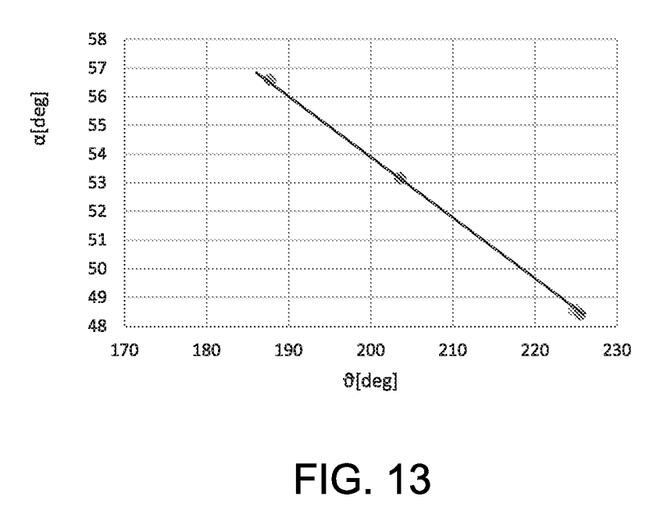

The value c=0 corresponds to perfect symmetry of the curves of FIG. 9 or 10 (tension as a function of the torque) in the positive and negative torque conditions. The above linear relation is shown in FIG. 13 for the value c=0.

The extremes of the variability interval of c are calculated based on accepted dissymmetry values in the above-mentioned curves equal to 5% of the installation tension. In particular, for the example N10, with an installation tension of 315 N an imbalance of 15.21 N is obtained for c=+10° and 14.98 N for c=−10°, both values being lower than 15.75 (5% of the installation tension).

Surprisingly, said optimal angle is independent of both the diameter of the pulley 5, and the layout of the drive.

Since the pulley system is symmetric with respect to the bisector line H of the winding angle θ, and since the resulting system of forces is symmetric, the plane P can be positioned indifferently on one side or the other of the line H (namely towards the pulley 23 or towards the pulley 27), forming with it in each case an angle α. In other words, two tensioners having respective axes A2 positioned on planes P arranged on opposite sides of the line H but forming with it the same angle α have identical behaviour.

The optimal position of the plane P defined above refers to the nominal position of the tensioner.

FIGS. 14 to 18 are partial schematic sections that illustrate alternative solutions for the axial and radial support of the rings 15, 20 on the base 11. Said solutions are illustrated by using the same numbers to indicate parts identical or corresponding to parts already described with reference to FIGS. 3-7, and refer to the detail highlighted in FIG. 5. For the sake of brevity, the descriptions of the support bushings are omitted, but they must in any case be interposed axially and/or radially whenever there is relative slipping between the rings 15, 20 and with respect to the base 11 and the spring 43, in order to avoid premature wear and to control damping of the oscillations.

Figure 14:
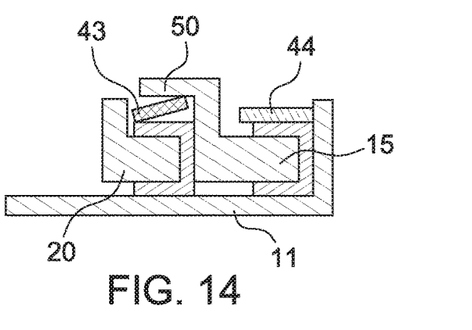
FIGS. 14 to 18 are schematic partial sections that illustrate embodiment variations of a detail of FIG. 5.

In the solution of FIG. 14, the disc spring 43 acts between a shoulder 50 integral with the first ring 15 and the second ring 20, exerting axial loads on them in opposite directions. In this way the first ring 15 is pushed axially against a shoulder 44 integral with the base 11 and the second ring 20 against the base 11.

Figure 15:
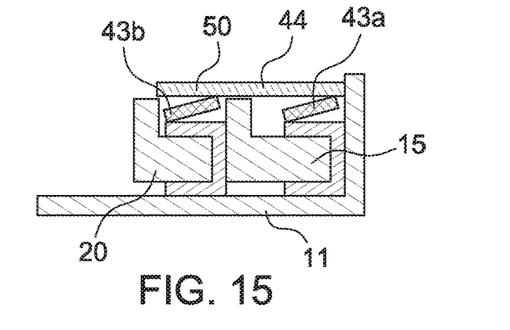

In the solution of FIG. 15 there are two disc springs 43*a*, 43*b* which act between a shoulder 44 integral with the base 11 and the respective rings 15, 20. In this way it is possible to independently control damping of the rotation of the first ring 15 and damping of the rotation of the second ring 20.

Figure 16:
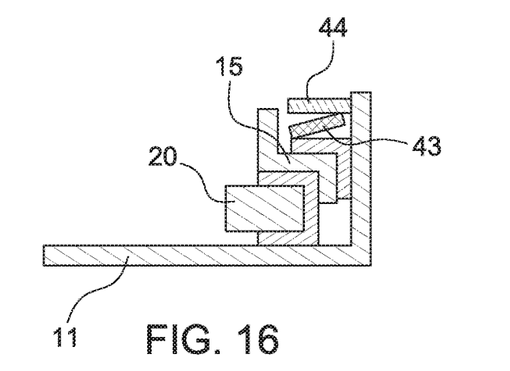

In FIG. 16 the first ring 15 is axially supported by the second ring 20, and the disc spring 43 acts between the fixed shoulder 44 integral with the base 11 and the first ring 15. In this case, therefore, the first ring 15 and the second ring 20 are arranged in series with respect to the axial load of the spring 43.

Figure 17:
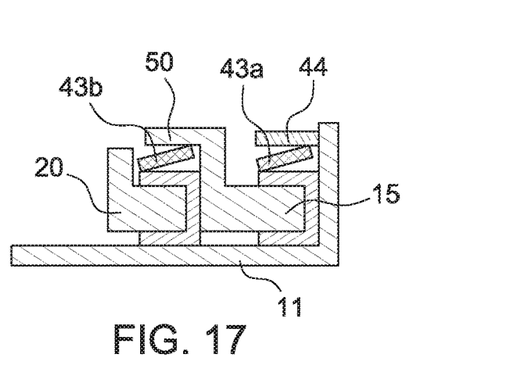

In the solution of FIG. 17 there are two disc springs 43a, 43b, one of which acts between the shoulder 44 integral with the base 11 and the first ring 15, and the other between a shoulder 50 integral with the first ring 15 and the second ring 20.

Figure 18:
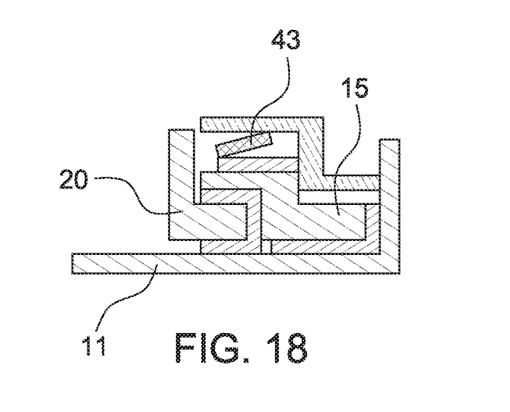

Lastly, FIG. 18 illustrates a solution in which the spring 43 acts on the first ring 15, which rests simultaneously on the base 11 and on the second ring 20.

The solution adopted has an impact on the possibilities of controlling damping of the rotations of the first and the second rings 15, 20, but does not vary the general operation of the tensioner previously described.

Figure 19:
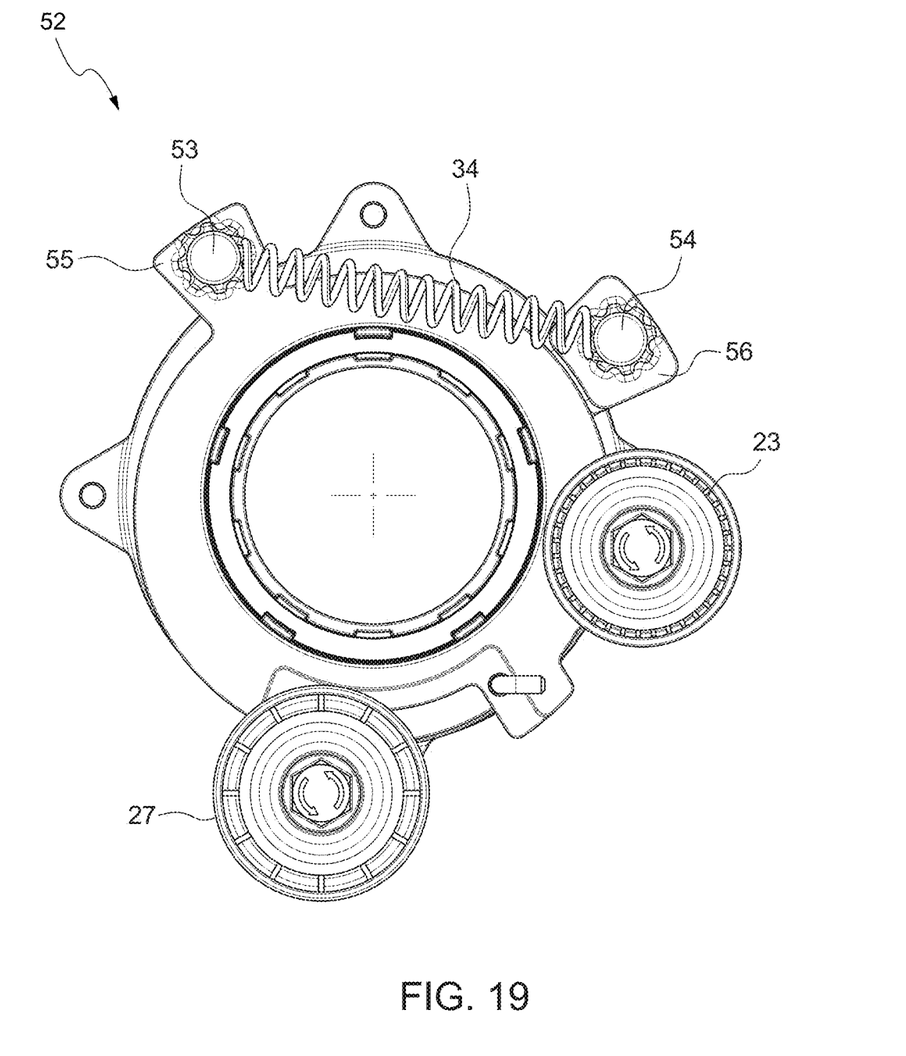
FIGS. 19 and 20 are a front view and a second embodiment respectively of a tensioner according to the present invention.
Figure 20:
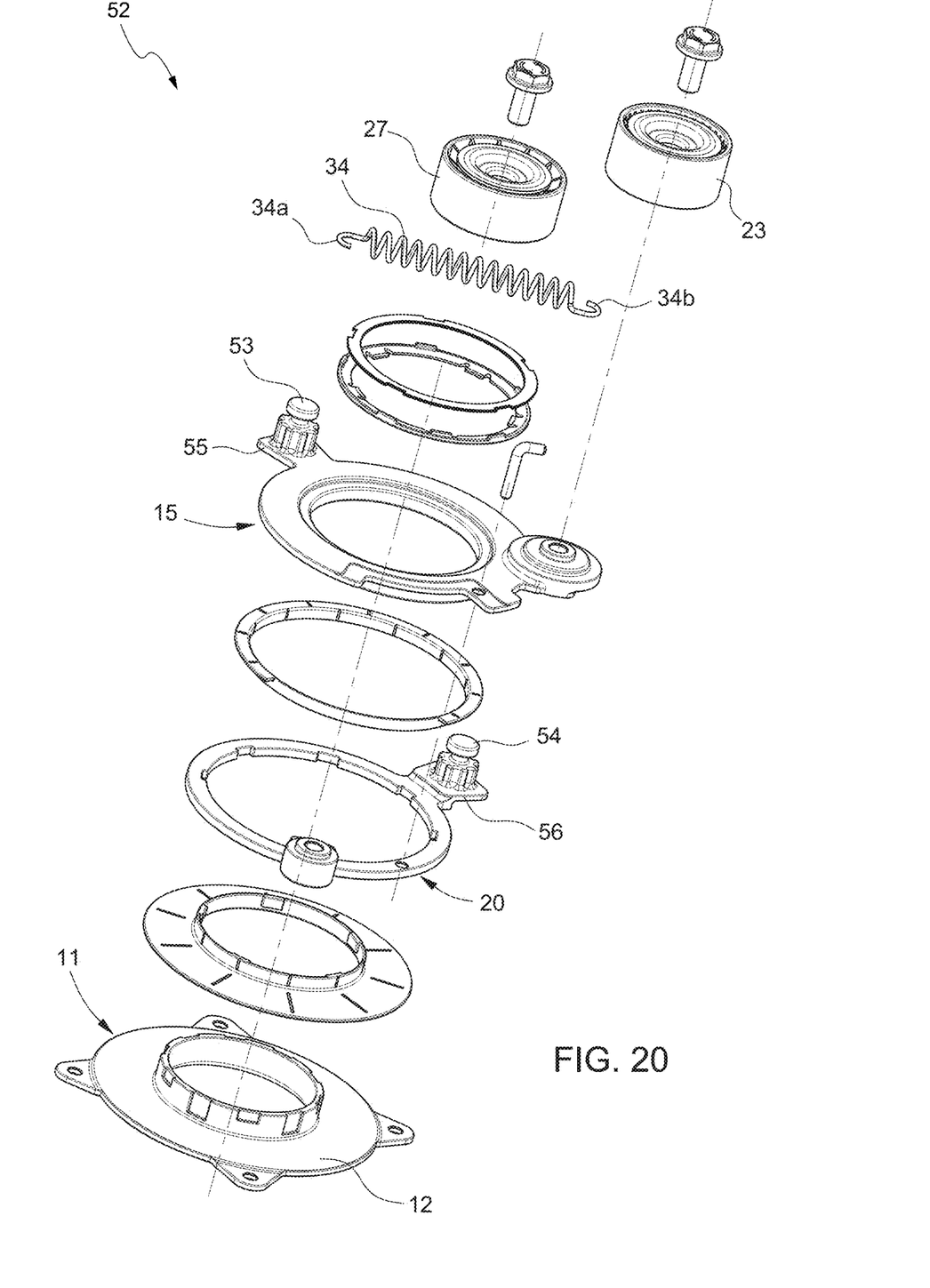

FIGS. 19 and 20 illustrate a tensioner 52 which is described below only insofar as it differs from the tensioner 10 described, using the same reference numbers to distinguish parts identical or corresponding to parts already described.

The tensioner 52 differs from the tensioner 10 due to the fact that the spring 34 is a helical traction spring arranged tangentially with respect to the first and the second rings 15, 20 and having respective hook-shaped ends 34a, 34b hooked to respective pegs 53, 54 integral with the first ring 15 and with the second ring 20 respectively and extending axially from respective external radial appendages 55, 56 thereof.

The positions of the pulley 23 carried by the first ring 15 and the pulley 27 carried by the second ring are reversed, with respect to the tensioner 10, since the traction spring 34 (instead of the compression spring as in the tensioner 10) determines a relative rotation in the opposite direction between the two rings 15, 20. The effect of the spring 34 is in any case always that of generating an elastic force tending to maintain the pulleys 23, 27 in contact with the belt 8 and therefore to maintain, in use, a predefined tension level in the belt 8.

From an examination of the tensioners 10, 52 produced according to the invention, the advantages it offers are evident.

In particular, due to the use of tensioner pulleys carried respectively by a first ring rotating around a first axis and by a second ring rotating with respect to the first ring around a second axis eccentric with respect to the first axis, it is possible to reduce the installation tension of the belt, given the same torque transmission capacity, without substantial increases in overall dimensions and cost of the tensioner.

Furthermore, it is possible to optimize operation of the drive in the positive and negative torque conditions of the electric machine by arranging the second axis, when the tensioner is in the nominal position, on a plane forming a predefined angle with the bisector of the winding angle.

The invention claimed is:

1. A tensioner for an accessory drive of an internal combustion engine, the drive including at least a first pulley connected to a drive shaft of the engine, at least a second pulley connected to an electric machine and a belt wound at least on the first and second pulleys, the tensioner comprising:
   a base configured to be fixed to a casing of the electric machine;
   a first ring rotating with respect to the base about a first axis (A1);
   a second ring rotating with respect to the first ring about a second axis (A2) distinct from the first axis (A1);
   a first tensioning pulley carried by the first ring and rotating with respect to the first ring about its own axis (PA1);
   a second tensioning pulley carried by the second ring and rotating with respect to the second ring about its own axis (PA2); and
   an elastic member acting on the first and second rings to push the first and second tensioning pulleys into contact with respective spans of the belt,
   wherein under nominal conditions a plane passing through the first and second axes (A1; A2) is inclined with respect to a bisector of a belt winding angle (θ) on the second pulley by an angle (α) that is a function of the belt winding angle (θ) on the second pulley according to the relation:

$$\alpha = -0.2166\theta + 97.267 + c,$$

where α and θ are expressed in degrees (°) and c is a variable comprised in the range between +10° and −10°.

2. The tensioner as claimed in claim 1, wherein one of the rings includes an appendage traveling within a recess of another of the rings for limiting the relative rotation between said rings.

3. The tensioner as claimed in claim 1, wherein one of the rings includes one of a protrusion and a groove, and the base includes another of the protrusion and the groove, wherein the protrusion and the groove slidingly cooperate for limiting the relative rotation between said one of the ring and the base.

4. The tensioner as claimed in claim 3, further comprising a pin insertable into respective holes of the first and second rings.

5. An accessory drive for an internal combustion engine comprising at least a first pulley connected to a drive shaft of the engine, at least a second pulley connected to an electric machine, a belt wound at least on the first and second pulleys, and a tensioner according to claim 1.

6. The tensioner as claimed in claim 1, wherein the base has an annular configuration, and wherein the base and the first and second rings have an internal diameter greater than the diameter of the second pulley so that the tensioner can be mounted on the electric machine without interfering with the second pulley.

7. The tensioner as claimed in claim 1, wherein said elastic means comprises at least one spring acting between the first and second rings.

8. The tensioner as claimed in claim 7, wherein the spring is a compression spring having end portions hooked to appendages of the respective first and second rings and arranged tangentially with respect to said rings.

9. The tensioner as claimed in claim 7, wherein the at least one spring is a compression spring having a first end portion housed in a first housing integral with the first ring and a second end portion housed in a second housing integral with the second ring.

10. The tensioner as claimed in claim 9, wherein the housings consist of radial appendages of the first and second rings and define circumferential channels closed, at circumferentially opposite ends, by radial walls defining shoulders for the first and second end portions of the spring.

11. The tensioner as claimed in claim 1, wherein the base includes an annular collar having an axis coincident with the first axis, the first ring being rotatably mounted around the collar by means of a first bushing.

12. The tensioner as claimed in claim 11, wherein the first ring has a cylindrical inner surface, coaxial to the first axis, which rotates around the first bushing, and an eccentric outer cylindrical surface coaxial to the second axis, said second ring being rotatable around the cylindrical outer surface of the first ring by means of a second bushing.

13. The tensioner as claimed in claim 12, comprising at least a spring exerting an axial load on at least one of said bushings to dampen the rotation of said rings.

14. The tensioner as claimed in claim 13, wherein the axial load acts on one of the two rings, the other ring being axially interposed between at least a portion of said ring and said base.

15. The tensioner as claimed in claim 13, wherein the spring is axially interposed between the first and the second rings and exerts axial loads in opposite directions on said first and second rings, one of said first and second rings being pushed against the base and another of said first and second rings being pushed axially against a shoulder integral to the base.

16. The tensioner as claimed in claim 13, comprising two springs exerting axial loads on the first and second rings, respectively.

* * * * *

UNITED STATES PATENT AND TRADEMARK OFFICE
CERTIFICATE OF CORRECTION

PATENT NO. : 12,270,470 B2
APPLICATION NO. : 18/003937
DATED : April 8, 2025
INVENTOR(S) : Pennazza et al.

Page 1 of 1

It is certified that error appears in the above-identified patent and that said Letters Patent is hereby corrected as shown below:

In the Specification

Column 6, Line 16, '$\alpha=-0.21660+97.267+c$' should read -$\alpha=-0.2166\theta +97.267+c$-

Column 6, Line 17, 'where a and 0 are expressed in' should read -where $\alpha$ and $\theta$ are expressed in- In the Claims Claim 1, Column 8, Line 14 and 16, 'belt winding angle (0)' should read -belt winding angle ($\theta$)-

Claim 1, Column 8, Line 15, 'an angle (a)' should read -an angle ($\alpha$)-

Claim 1, Column 8, Line 19, '$\alpha=-0.21660+97.267+c$' should read -$\alpha=-0.2166\theta +97.267+c$-

Signed and Sealed this
Ninth Day of December, 2025

John A. Squires
*Director of the United States Patent and Trademark Office*